United States Patent [19]

Glucksman

[11] Patent Number: 4,818,344

[45] Date of Patent: Apr. 4, 1989

[54] WATER DISTILLING APPARATUS

[76] Inventor: Dov Z. Glucksman, 462 Boston St., Topsfield, Mass. 01983

[21] Appl. No.: 133,930

[22] Filed: Dec. 17, 1987

[51] Int. Cl.$^4$ ............................. B01D 3/02; C02F 1/04
[52] U.S. Cl. ........................................ 202/176; 202/83;
 202/181; 202/185.3; 202/185.5; 202/206;
 202/234; 202/266; 203/11
[58] Field of Search ............... 202/83, 181, 176, 185.3,
 202/185.5, 234, 206, 266; 203/10, 11, 2, 1, DIG.
 17, DIG. 9; 159/43.1, 44

[56] References Cited

U.S. PATENT DOCUMENTS

| | | | |
|---|---|---|---|
| 1,325,199 | 12/1919 | Jewell | 202/234 |
| 2,217,266 | 10/1940 | Cookson | 203/DIG. 17 |
| 2,376,876 | 5/1945 | Laliberte | 202/83 |
| 2,420,819 | 5/1947 | De Stefano | 202/83 |
| 3,494,835 | 2/1970 | Mahistre | 202/181 |
| 3,507,753 | 4/1970 | Jacuzzi | 203/10 |
| 3,830,705 | 8/1974 | Dewegeli | 202/83 |
| 4,052,267 | 10/1977 | McFee | 202/83 |
| 4,331,514 | 5/1982 | Bauer | 202/181 |
| 4,339,307 | 7/1982 | Ellis | 202/180 |
| 4,482,431 | 11/1984 | Voorhees | 203/10 |
| 4,525,243 | 6/1985 | Miller | 203/DIG. 17 |
| 4,536,257 | 8/1985 | Atwell | 203/DIG. 17 |
| 4,612,090 | 9/1986 | Ellis | 203/10 |

Primary Examiner—Wilbur Bascomb
Attorney, Agent, or Firm—William J. Bundren

[57] ABSTRACT

A portable water distiller comprising a vaporization chamber containing an electric coil heating element, a finned tube condenser coil, and an electric fan motor for cooling the condenser coil's outer surface. In a preferred embodiment, the vaporization chamber includes an upper vertical tube having an open bottom and closed top communication with the condenser, and a raw water receptacle with its rim surrounding the tube at a distance and with its bottom near the bottom end of the tube. The receptacle of the portable water distiller is automatically kept full with water up to a predetermined level, and is readily removable from the distiller for cleaning of residue, the lower portion of the tube is similarly removable for access to the heating element. The condenser coil is designed to offer low flow resistance resulting in only a small over-pressure in the vaporization chamber thus affecting only a small depression of the water level therein.

9 Claims, 2 Drawing Sheets

WATER DISTILLING APPARATUS

BACKGROUND OF THE INVENTION

The present invention relates to an electrically operated domestic water distilling apparatus. It relates particularly to a distilling apparatus operating at a small over-pressure, so designed as to permit ready cleaning of the evaporation chamber and of the electric heating element.

It has long been recognized that the drinking water in many communities has an unpleasant taste due to chlorine, minerals, or suspended organic matter. Such water may also contain chemicals, bacteria, or other contaminants believed to endanger health. This condition, widely publicized in recent years, has become much more acute due to the proliferation of chemical wastes. In some communities, residents will not drink the water, and have either resorted to purchasing bottled water (generally expensive), or have installed central water purifying plants or distilling apparatuses.

All known water distillers prior to the present invention comprise a closed evaporation chamber, a heating element located near the chamber bottom, a stream outlet located near the top of the chamber and leading to a usually finned condenser coil, and a fan which blows fresh air over the condenser surface. The evaporation chamber is usually removable so that it can be filled with raw water, and so that residues and sediments can be removed.

The main problems incurred with all distilling apparatuses of the prior art are:

1. The need to clean the bottom of the evaporation chamber from sediments, requiring disassembly of the whole chamber or its lower portion, and which may be heavy with contaminated raw water; the chamber must be reassembled, a process which is often difficult due to the necessity of a seal-tight connection.

2. Droplets of impure water are often carried into the condenser portion of the apparatus, particularly at the beginning of the distilling operation, when the water level in the boiling chamber is high; such spillage impairs the purity of the distilled water.

3. The initial time for starting the distilled water flow is relatively long, since the entire mass of water in the chamber must be brought to the boiling point prior to the inception of the distillation process.

One type of distilling apparatus is disclosed in U.S. Pat. No. 4,342,623 (Loeffler). This invention is portable and has an insulated container for raw water and a removable cover for the container, and includes a a low-pressure seal which engages the container wall. A condenser coil is provided in the cover, along with a motor-driven fan; and inlet and outlet ports are provided about the periphery of the cover to allow cooling air to be drawn into the cover over the condenser coil and motor. An inlet tube connected to the condenser coil receives steam generated by a heater connected to the container bottom.

It is evident that stripping and reconnecting the unit for cleaning purposes—a task to be done at least once a week—is quite formidable, owing to the need to install the pressure seal and to scrub the interior of the chamber and the heater.

Another type of water distiller is disclosed in U.S. Pat. No. 4,339,307 (Ellis), which comprises a boiler compartment and a water-filled condenser compartment, combined in one shell, but separated by a partition wall. A condenser coil is disposed in the condenser compartment, and the stream passing therethrough is condensed by the raw water in the upper compartment. A drain valve is provided in the boiler compartment, which should serve to purge impurities collected in the boiler. The water level in the boiler is controlled by a float valve which admits raw water from the condenser compartment, the latter having a similar float valve serving to control its water level. There exists no means for cleaning the bottom of the boiler, and it is evident that sediment will accumulate both in the boiler container, and on the electrical immersion heater. These elements can, therefore, only be removed by complete stripping of the water distiller.

Another portable water distiller is disclosed in U.S. Pat. No. 4,052,267 (McFee), and is characterized by a flexible impermeable bag dividing a cylindrical housing into a vaporating space and a distilled-water space. The steam is condensed in a tubular condenser cooled by an electric fan. The housing is adapted to be separated from the condenser portion for cleaning, and is designed to be subsequently reassembled in a seal-tight connection. By tilting the entire apparatus, distilled water is drawn from the distilled-water space by means of a tap or, in the case of a small unit, through a spout. A raw-water inlet permits filling of the vaporizing space, and a tap near the bottom permits limited access to the housing for cleaning.

McFee also claims a water distiller which comprises a boiler space in the form of a vertical tube positioned inside the impermeable bag. After the bag has been filled with raw water and the electric heater has been energized, the generated steam creates a pressure which presses the water level in the tube to about 5 to 7 inches below the level of the water level in the bag, a pressure which is sufficient to overcome the resistance of the condenser ducts. The bag is provided with an inlet opening for filling with raw water, while steam enters the space contained between the outside of the bag and the inside of the housing where it is condensed into distilled water.

The primary drawback of these embodiments is that cleaning the boiler, the evaporation space, or the electric heater is possible only with complete dis-assembly of the apparatus.

Other water distillers are described in U.S. Pat. Nos. 3,350,279 (Tolchin), 3,935,077 (Dennison), and 4,081,331 (Weiss), all of which disclose devices which are most difficult to clean.

One object of the present invention is the elimination or reduction of these drawbacks by providing a portable water distiller which lends itself to easy removal of residues and sediment by simple manipulation of movable parts.

Another object of the present invention is to provide a distiller which is capable of supplying distilled water within a short time after being energized.

Another object of the present invention is to provide a distilling apparatus with means for filling and drawing water from the reservoir without the need of lifting or tilting the apparatus, a feature which not only reduces the possibility of contamination of the distilled product, but also is more convenient for elderly or handicapped people.

Another object of the present invention is to provide a distilling apparatus devoid of seal-tight connections, components which are apt to deteriorate with time, and which make the dis-assembly of the parts to be cleaned a difficult task—again a feature adapted for the handicapped and elderly, and for the reduction of contamination.

Another object of the present invention is to provide a distiller with means for removing from the water all organic volatiles—prior to the water being fed into the evaporation chamber.

Finally, another object of the present invention is to provide a distiller with an activated charcoal filter adapted to absorb organic matter prior to the water being conveyed into the evaporation chamber.

SUMMARY OF THE INVENTION

The distilling apparatus of the present invention comprises a housing, a vaporization chamber, an electric coil heating element located in the chamber, a thin-tubed condenser coil provided with a distilled-water outlet, and an electrically operated fan serving to cool the condenser. The characteristic features of the present invention are in the vaporization chamber, comprising a vertical vaporization chamber having a closed top and an open bottom, and a raw-water receptacle including a generally flat bottom and upstanding side walls distanced from the walls of the vaporization chamber, the open chamber bottom being positioned close to the bottom of the receptacle so as to leave a gap therebetween for the entry of water into the chamber interior. The water receptacle communicates with a portable water container in a manner causing the water level in the receptacle to remain at a predetermined level above the bottom end of the chamber. The electric heating element is positioned inside the chamber near the bottom end, and the feeler of the thermostatic switch is attached to the heater coil, serving to discontinue the operation as soon as the water level drops below the heating element.

The water receptacle is supported in the housing of the apparatus in a manner permitting its ready removal for thorough cleaning and its subsequent insertion into its working position.

In a preferred embodiment, the vaporization chamber consists of an upper portion containing a steam outlet and a separate lower portion surrounding the heating coil, which is normally seal-tight connected to the upper portion, but is readily removable for cleaning and for access to the heating coil.

In another preferred embodiment, the raw-water receptacle is extended sideways to form a filling compartment positioned underneath the outlet opening of an inverted raw-water can; the can opening is closed by a spring-loaded valve which, in its inverted state, is held open against the spring force by a vertical pin jutting out of the compartment. In this way, water flows out of the can and into the compartment only as long as the water level is low enough to permit air to enter the can to replace the outflowing water, whereby the water level in the compartment and in the main portion of the receptacle remains substantially constant. The compartment communicates with the main portion of the raw water receptacle by a small opening in an otherwise closed partition between the two portions, thus preventing hot water from entering the filling compartment from the main portion surrounding the vaporization chamber.

The energized electric heater coil heats the water inside the chamber above the boiling point, causing it to evaporate and to create steam pressure in the chamber sufficient to overcome the flow resistance in the condenser coil. This pressure lowers the water level in the chamber below the water level in the surrounding water receptacle, the condenser tubing and the water level in the receptacle being designed so as to maintain permanent immersion of the heating coil in the water.

The raw water in the main portion of the receptacle surrounding the vaporization chamber is heated by convection and conduction to a temperature below, but close to, the boiling point, causing organic volatiles, such as alcohols, ketones, oils, and aldehydes to evaporate before the water enters the vaporization chamber through the bottom gap. The volatiles are mounting to the top of the housing from where they are exhausted through an opening by the draft of the electric fan.

The filling compartment is advantageously filled with activated charcoal serving to absorb organic matter from the water before its entry into the main portion of the receptacle, the absorbing action being increased by the fact that the water in the filling compartment is heated to about 40° centigrade (104° Fahrenheit) by proximity to the hot water in the main compartment.

SPECIFIC DESCRIPTION OF THE INVENTION

Figure 1:
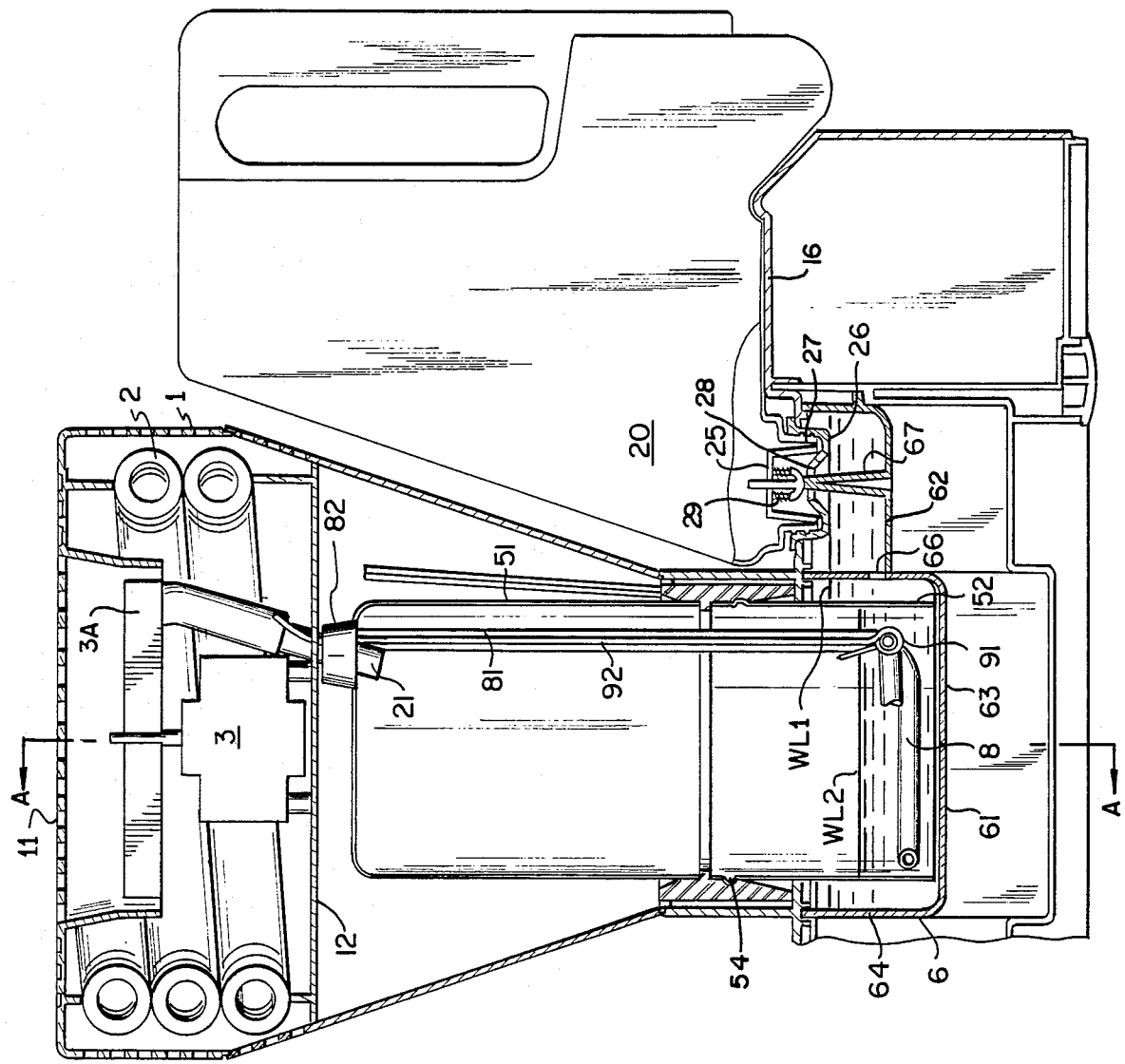
FIG. 1 is a vertical section through a water distiller and through a portable raw water can.
Figure 2:
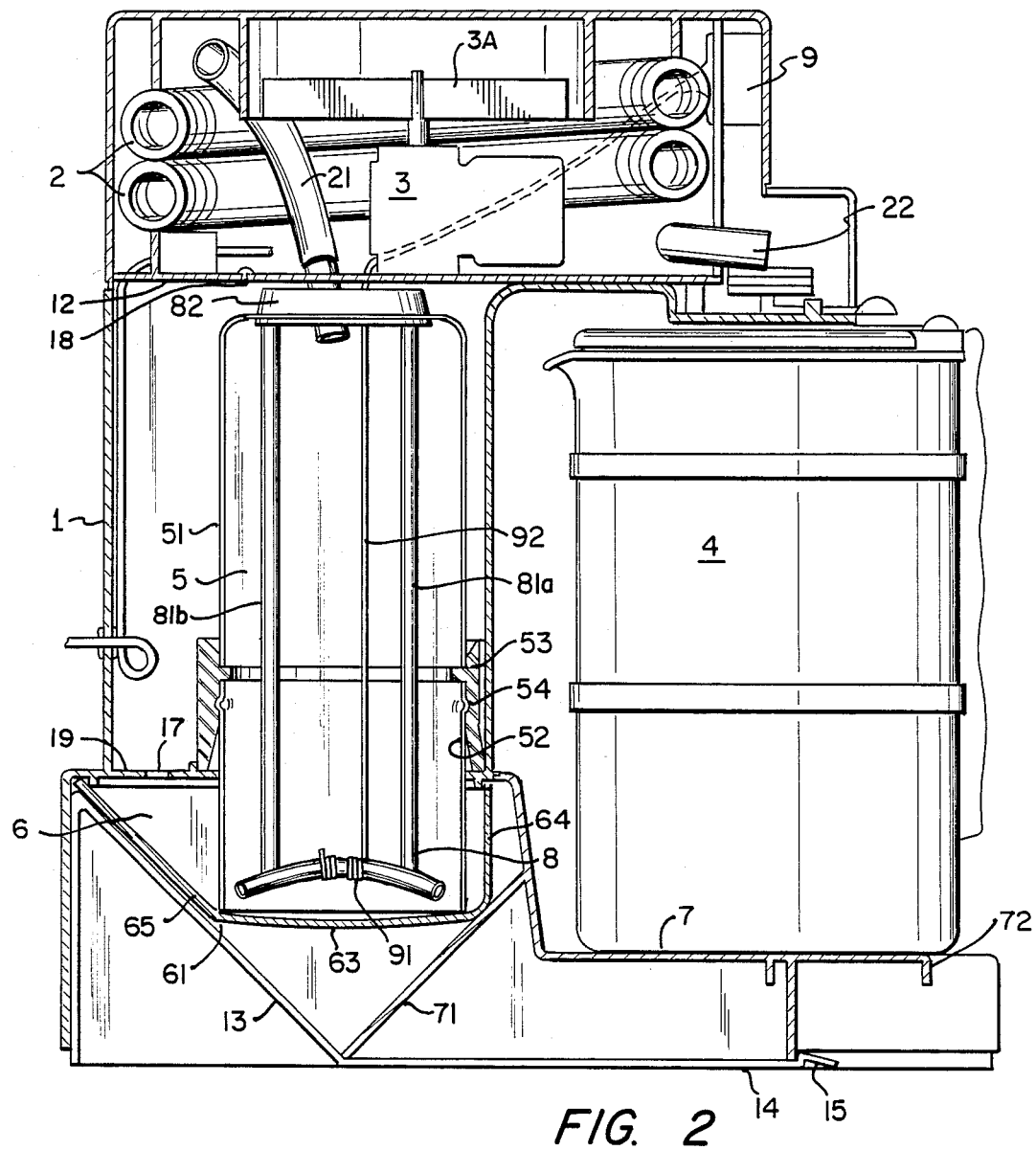
FIG. 2 is a section along line A—A of FIG. 1.

An embodiment of the distilling apparatus illustrated in the drawings is enclosed in an outer casing 1, which is composed of several parts in order to facilitate mounting and assembly of the distilling components. The top portion of the casing is separated from the bottom portion by a horizontal partition 12, and is perforated by a plurality of openings 11 which permit the entry of cold air and the exhaust of heated air. A finned tube condenser coil 2 and an electric motor 3 and fan 3a are positioned in the top portion in concentric alignment in order to cool and to condense the steam generated by the vaporizing equipment. A steam inlet 21 enters the condenser coil 2 at the top, and a water outlet 22 delivers distilled water into a beaker 4.

The bottom portion of the casing contains the vaporizing section of the distiller, and comprises a vaporizing chamber 5 composed of a top section 51 in the shape of an inverted cup, and a bottom section 52 in the shape of an open-ended tube, the two sections being interconnected and held in position by an external sleeve 53 by means of inwardly protruding knobs 54 which engage with corresponding holes in the lower section 52.

The water to be evaporated is contained in a raw-water receptacle 6, which consists of a main compartment 61 and a filling compartment 62. The main compartment is of larger horizontal dimensions than the vaporization chamber and consists of a generally flat bottom 63, three upstanding side walls 64 and one sloping side wall 65. The filling compartment 62 is attached to one of the side walls 64, and communicates with the main compartment by means of a small opening 66 in the wall. The filling compartment is provided with a vertical pin 67 jutting up from its bottom, which opens a valve in the raw-water can, as will be described below.

The receptacle 6 is supported on and held in position on one side by a sloping wall 13 of the casing, and on the other side, by a sloping wall 71 of a drawer 7. The drawer 7 is supported by a base-plate 14 forming part of the casing, and is held in position by a catch 15. The drawer is extended to the outside of the casing and forms a flat horizontal platform 72 which supports a water beaker 4.

An electric heating coil 8 is positioned close to the open bottom end of the vaporizing chamber 5, its vertical conductor sections 81a and 81b extending through the closed top of the upper vaporizer section 51 sealed by a resilient stopper 82.

The sensor 91 of a thermostatic switch 9 is firmly wound around a portion of the heating coil 8, and communicates with the switch 9 via a sensor tube 92 which also passes through the stopper 82 in a seal-tight arrangement. The steam inlet 21 to the condenser coil is similarly guided through an opening in the stopper 82.

Raw water is brought to the apparatus by means of a can 20 which is supported, in upturned state, by a platform 16 extending sideways from the main casing 1. The can opening 27 is closed by a spring-loaded valve including a valve body 25 and a valve seat 28. In the upturned position of the can, the pin 67 in the filling compartment urges the valve body 25 off the valve seat 28 against the force of the spring 29, and water flows out of the can into the compartment 62, and from there, into the compartment 61 through opening 66. The water rises up to the rim 26 around the can opening, whereafter no more water can flow out, since no air can enter the can through the opening. The water level is marked WL1, and water enters the main compartment 61 and the vaporizing chamber 5 up to the same level, which is kept at a short height above the heating element, resulting in the ability to heat small volume of water, thus permitting quick evaporation.

As soon as the heating coil 8 is energized, the water in the chamber is heated to the boiling point and starts to evaporate, thereby creating a pressure sufficient to overcome the flow resistance of the condenser tubing. This pressure lowers the water level in the chamber (marked WL 2), and remains at a sufficient height above the surface of the heating coil 8, due to the duly dimensioned size of the condenser tubing. Steam leaves the chamber 5 and enters the condenser coil 2, where it is reconverted to pure water and delivered to the beaker 4 through the water outlet 22, with cooling air being provided by the electric motor 3 and fan 3a.

Figure 3:
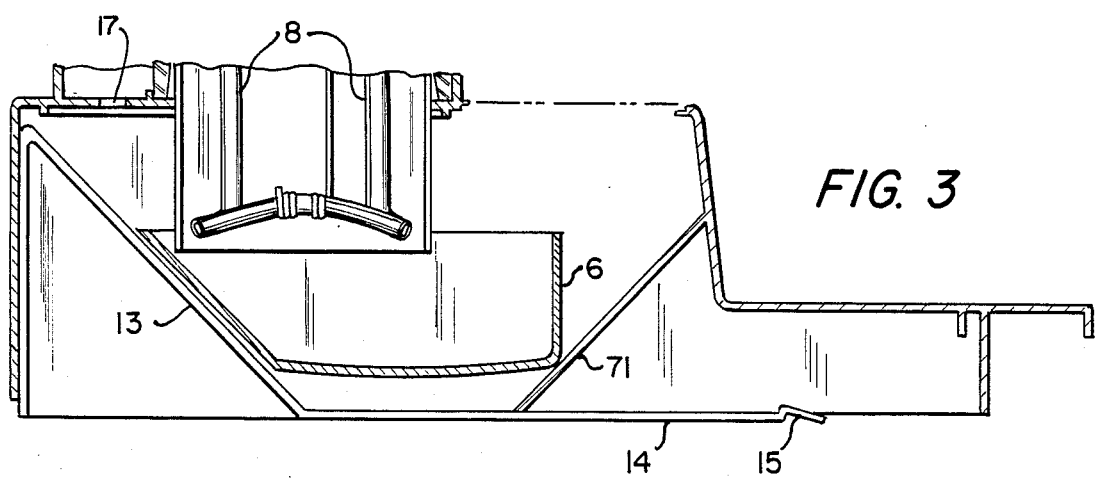
FIG. 3 is the section shown in FIG. 2, and shows the raw water receptacle lowered and moved sideways from its normal working position.

For the purpose of cleaning, the raw water receptacle is taken out of the casing as shown in FIG. 3. The beaker 4 is lifted off of the platform 72, and the drawer 7 is pulled away by slipping it over catch 15. This motion removes the supporting wall 71 from the receptacle, resulting in its slipping downward along the sloped wall 13. As soon as the bottom end of the vaporizer chamber has been cleared, the receptacle can be taken away for cleaning its bottom section of sediments and residues. If necessary, the lower section 52 of the chamber 5 can be slipped downwards over the knobs 54, providing easy access for cleaning the electric heating coil.

An important result of the present invention's design of the vaporization chamber is the evaporation of volatiles, such as ketones, alcohols, oils and aldehydes from the water surface in the receptacle portion surrounding the evaporation chamber. The water in this portion is heated by proximity to the boiling water in the chamber, by convection and conduction, to a temperature somewhat below the boiling point of water (about 90° C.), sufficient to remove volatiles before the water enters the vaporization chamber. The evaporated gases rise to the top of the casing below partition 12 and escape into the top portion through openings 17 and 18 in the partition 19 and 12, respectively, from where the volatiles are carried into the open by the suction of the fan.

For additional pre-cleaning of the raw water, filling compartment 62 may be filled with activated charcoal which absorbs organic matter before the water reaches the main compartment of the receptacle. The action of the activated carbon is especially strong due to the rise in water temperature to about 40° C. (104° F.).

For continuous operation, the apparatus can be built as a twin unit, with two cans emptying into two filling compartments arranged on both sides of a central main compartment of a receptacle, and with two beakers positioned in front of the twin unit, to be filled from the distilled water outlet via a distributing pipe.

The advantages of the present invention are:

(1) easy and thorough cleaning of the vaporization chamber, of the electric heating coil, and of the lower portion of the vaporization chamber;

(2) removal of volatile components before evaporation;

(3) fast starting evaporation due to the small quantity of water in the vaporization chamber;

(4) pre-cleaning water by means of an optional embodiment which includes activated charcoal.

These advantages are not found in any of the known water distilling units, either stationary or portable.

Although the invention has been described in connection with certain embodiments, it is to be understood that variations and modifications may be resorted to, as will be apparent to those skilled in the art. Such variations and modifications are to be considered within the purview and scope of the invention as set forth in the following claims.

I claim:

1. A water distilling apparatus comprising
a vaporizing portion containing an electric heating element and thermostatic control means serving to protect said heating element from overheating;
a condensing portion including a condenser coil communicating with said vaporizing portion by a steam conduit and provided with a distilled water outlet;
an electric fan adapted to blow outside air over the surface of said condenser coil;
means for supplying raw water to said vaporizing portion, and means for receiving distilled water from said condensing portion;
said water vaporizing portion comprises a raw water receptacle including a main compartment having a bottom and upstanding side walls, and a filling compartment provided with means for being supplied with raw water up to a pre-determined height, said filling compartment communicating with said main compartment through a small-size opening effecting a substantially uniform water level in said filling compartment and in said main compartment; and a vertical vaporizing chamber having a closed top and open bottom of smaller horizontal dimensions than those of said main receptacle compartment and positioned in said main compartment close to and distanced from the bottom of said compartment, said electric heating element being positioned close to the open bottom end of said vaporizing chamber.

2. The water distilling apparatus of claim 1 comprising an outer casing which contains said vaporizing portion and said condensing portion.

3. The water distilling apparatus of claim 2 provided with means for lowering said raw-water receptacle and for withdrawing it sideways from said casing for cleaning purposes.

4. The water distilling apparatus of claim 1 wherein said vaporizing chamber is composed of an upper portion closed at its top and provided with a steam outlet, and of a lower tubular portion sealingly and removably connected to said upper portion, permitting its removal for access to said heating element.

5. The water distilling apparatus of claim 1 wherein raw water is supplied to said receptacle by means of a can provided with an opening including a spring-loaded valve serving to close said opening and adapted to be positioned in an upturned state and with said opening placed over said filling compartment, a vertical pin integral with said compartment urging said valve into an opened state.

6. The water distilling apparatus of claim 5 wherein said can is provided with a rim surrounding said valve, said rim serving to control the water level in said receptacle by preventing air from entering said can from below, as soon as the water level has reached said rim.

7. The water distilling apparatus of claim 4 comprising an outer sleeve serving to connect said upper and said lower portion of said vaporizing chamber in sealed alignment, and to hold said lower portion in position by means of inwardly protruding knobs in engagement with holes in said lower portion.

8. The water distilling apparatus of claim 1 in the form of a twin unit comprising a raw water receptacle provided with two filling compartments attached to opposite sides of said main compartment.

9. The water distilling apparatus of claim 5 wherein the water level in said filling compartment and in said main compartment is maintained at a small distance above said heating element by means of said spring-loaded valve in said opening of said can.

* * * * *